United States Patent
Ortwein

(10) Patent No.: US 7,207,543 B2
(45) Date of Patent: Apr. 24, 2007

(54) MOUNTING SYSTEM FOR FITTING FIXING ELEMENTS ON A WALL

(75) Inventor: Ernst Georg Ortwein, Ebersbach (DE)

(73) Assignee: Nie Wieder Bohren AG, Hanau (DE)

( * ) Notice: Subject to any disclaimer, the term of this patent is extended or adjusted under 35 U.S.C. 154(b) by 0 days.

(21) Appl. No.: 10/493,518

(22) PCT Filed: Oct. 25, 2002

(86) PCT No.: PCT/EP02/11966

§ 371 (c)(1),
(2), (4) Date: Apr. 23, 2004

(87) PCT Pub. No.: WO03/036106

PCT Pub. Date: May 1, 2003

(65) Prior Publication Data

US 2005/0012002 A1    Jan. 20, 2005

(30) Foreign Application Priority Data

Oct. 25, 2001 (DE) ................. 101 52 052

(51) Int. Cl.
*A47F 1/14* (2006.01)
*A47G 1/16* (2006.01)
*B60R 1/02* (2006.01)
(52) U.S. Cl. .............. 248/467; 248/205.3; 156/578
(58) Field of Classification Search ........... 248/467, 248/205.3, 475.1; 156/575, 578; 411/82, 411/82.1, 82.3
See application file for complete search history.

(56) References Cited

U.S. PATENT DOCUMENTS

| | | | | |
|---|---|---|---|---|
| 3,532,316 A | * | 10/1970 | Gunther | 248/205.3 |
| 3,964,531 A | * | 6/1976 | Schenk | 411/82.1 |
| 4,923,159 A | * | 5/1990 | Wang et al. | 248/205.3 |
| 4,932,805 A | * | 6/1990 | Mullen et al. | 403/13 |
| 5,029,786 A | * | 7/1991 | Wu | 248/205.7 |
| 5,065,489 A | * | 11/1991 | Mullen et al. | 29/281.5 |
| 5,121,896 A | | 6/1992 | Frye | |
| 6,099,193 A | | 8/2000 | Hangleiter et al. | |

FOREIGN PATENT DOCUMENTS

| | | |
|---|---|---|
| DE | 441 6884 | 11/1995 |
| DE | 101 20388 | 10/2001 |

* cited by examiner

*Primary Examiner*—Amy J. Sterling
(74) *Attorney, Agent, or Firm*—Collard & Roe, P.C.

(57) ABSTRACT

The invention relates to a mounting system for fitting fixing elements on a wall. The aim of the invention is to allow easy mounting of fixing elements, in a cost-effective manner and with simple means, especially in rooms provided with tiles or similar wall coverings. For that purpose, the inventive mounting system comprises a base body constituting a fixing element and having at least one filling opening for introducing a bonding and fixing agent between the wall and the fixing element. The base body also has openings for penetration and distribution of the bonding and fixing agent. The base body and/or its back side oriented towards the wall are designed so as to be fluid- and gas permeable.

6 Claims, 4 Drawing Sheets

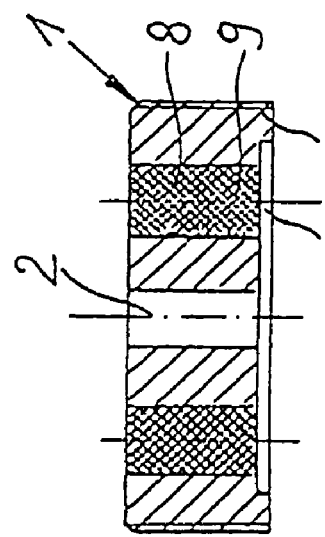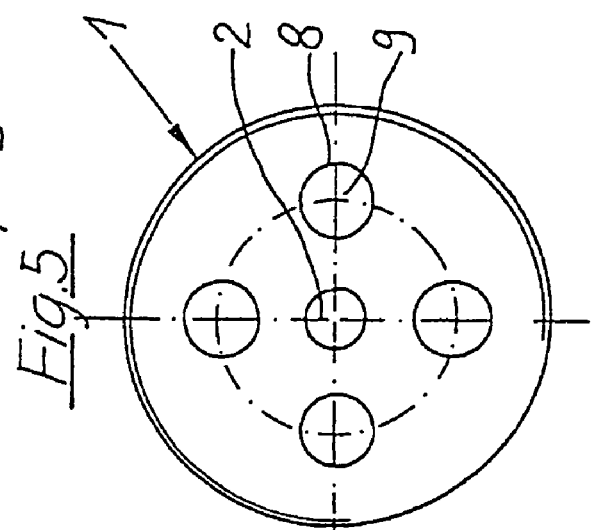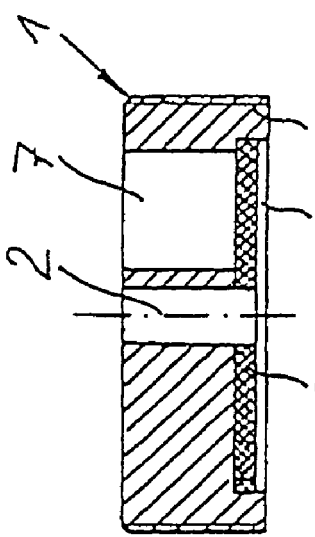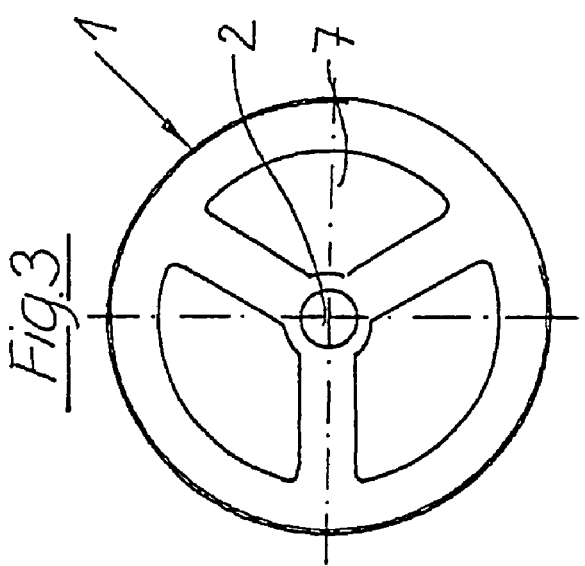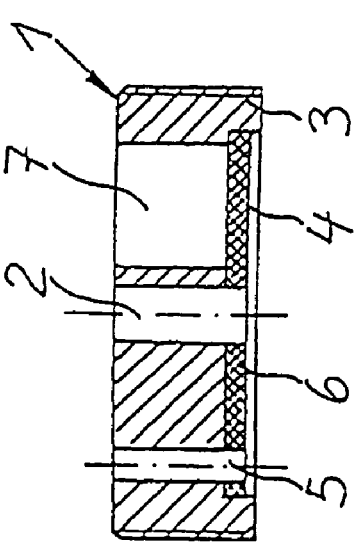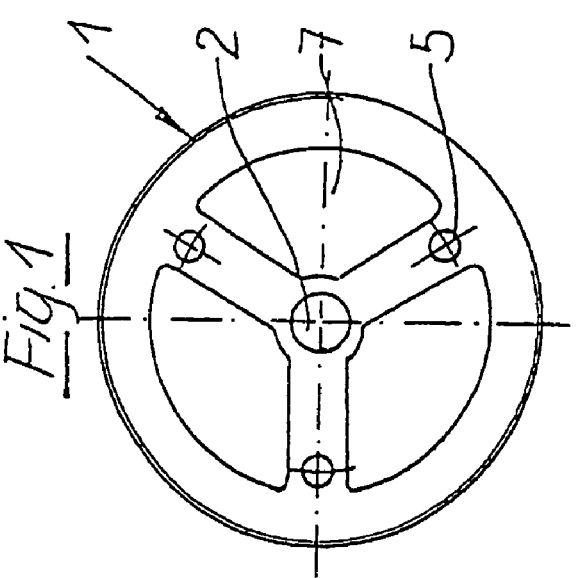

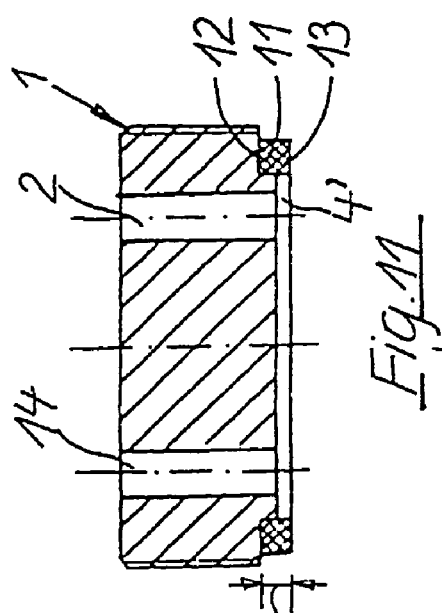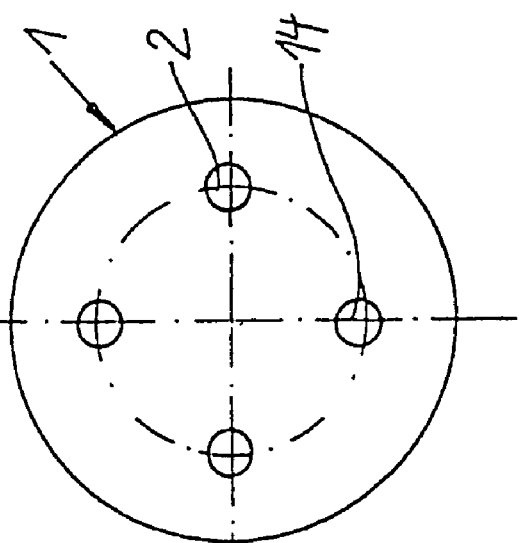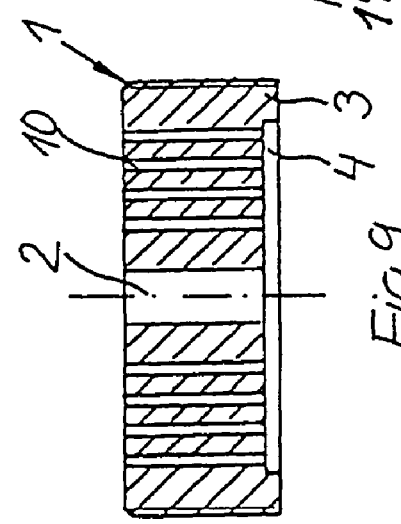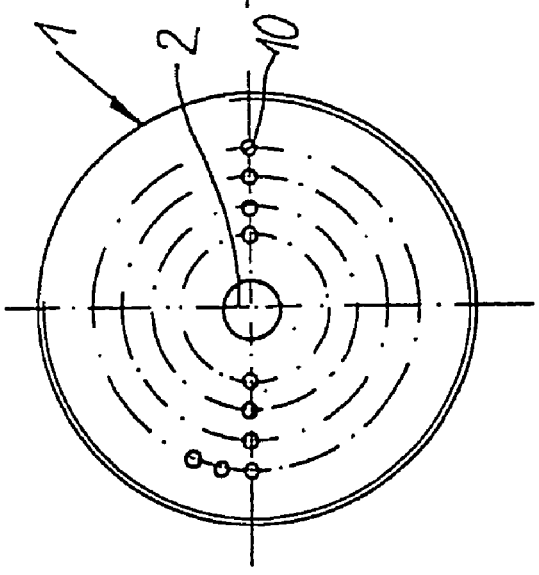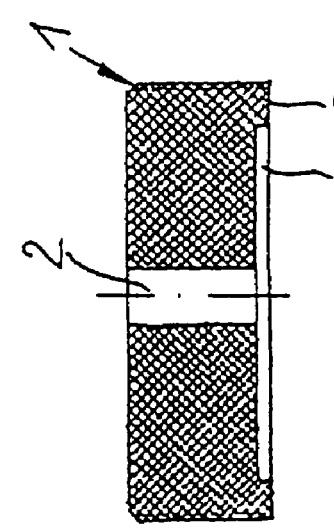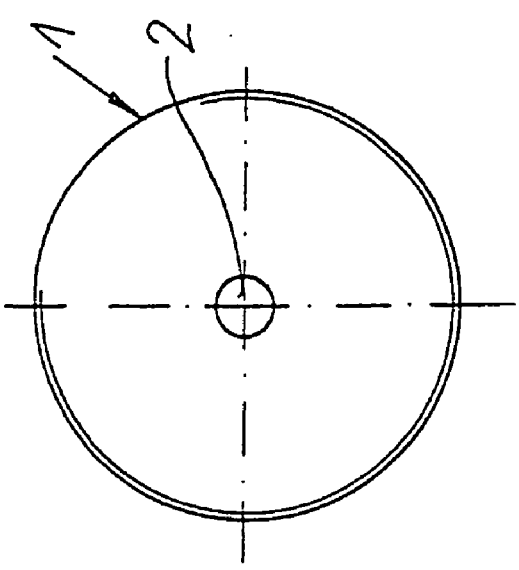

MOUNTING SYSTEM FOR FITTING FIXING ELEMENTS ON A WALL

CROSS REFERENCE TO RELATED APPLICATIONS

Figure 1A:
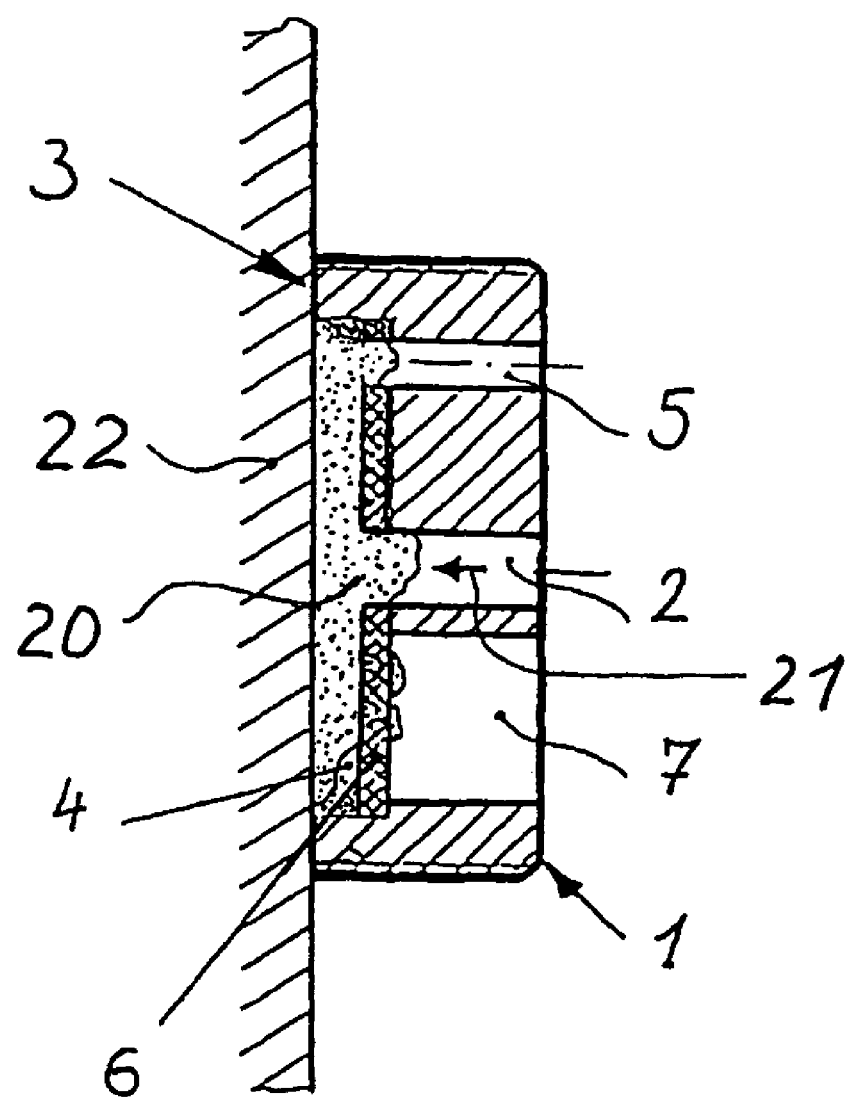

Applicant claims priority under 35 U.S.C. §119 of German Application No. 101 52 052.2 filed on Oct. 25, 2001. Applicant also claims priority under 35 U.S.C. §365 of PCT/EP02/11966 filed on Oct. 25, 2002. The international application under PCT article 21(2) was not published in English.

The invention relates to an installation system for affixing fastening elements to a wall, particularly in rooms fitted with tiles, marble panels, or similar wall paneling, whereby the fastening element is configured to hold objects that are fixed in place, such as towel holders, shelves, or similar fixture articles.

A large number of installation systems for affixing fastening elements of the most varied configuration forms and materials on walls in the sanitary and kitchen sector is known from the state of the art, whereby there is the problem, particularly for such walls and their wall paneling in the form of tiles or marble panels, that the fastening elements, particularly in the case of a tile wall, are attached between the tiles, in the join lines, for example, in conventional manner, particularly in the region of the join line intersections, by means of drill holes, whereby the tiles adjacent to the join line, in each instance, are often damaged, they splinter, or their glaze cracks, and in addition to optically perceivable losses of quality, this also results in subsequent damage, connected with complicated re-finishing or, in the case of a relocation of the fastening site or an incorrect installation in areas that are difficult to reach, such as corners and edges, not only is it difficult to affix the fastening elements, but also ugly holes that must be closed up again are formed. For this reason, the fastening elements are attached by means of the most varied types of glue connections, in many instances, but these must meet the requirements that the fastening elements must absorb great forces, to accommodate additional holder elements in the form of objects fixed in place, such as towel holders, shelves, etc., taking into consideration the design conditions and the static conditions, such as strength of the glue, strength of the fastening element, surface stress of the installation system, and the structure of the wall systems.

Proceeding from this state of the art, the invention is based on the task of creating an installation system for affixing fastening elements to a wall, particularly in rooms fitted with tile walls, i.e. wall tiles, in which the disadvantages of the state of the art as described are eliminated, on the one hand, using simple means, and, on the other hand, the fastening elements can be easily installed; the latter are furthermore supposed to be inexpensive to produce.

To accomplish this task, the invention proposes an installation system having the characteristics of claim 1, consisting of a base body that has at least one filling opening for introducing a bonding or fixing agent between the wall and the fastening element, as well as at least one opening (also called vent opening) for drawing off excess bonding and fixing agent. The base body and/or the back of the base body that faces the wall are configured in a new type of embodiment, at least in a partial region, so as to be fluid-permeable and/or gas-permeable.

A silicone sealer is preferably provided as the bonding and fixing agent between the wall and the base body of the fastening element.

In a further development of the invention, a closure element that can be inserted into the filling opening after filling is additionally used as a pressure element for pushing the bonding and fixing agent into the said shape structure and for pressing the same out of the filling channel, at least in part.

It is also preferably provided that the front of the base body, which faces away from the wall, is at least partly covered by a closure element, after the base body has been filled with the bonding and fixing agent, preferably after the latter has cured or hardened.

It is advantageous that the base body is particularly configured as a one-part, round molded part, and has a broken-out part between the (vent) openings, in each instance.

In addition, it is preferably provided that the (vent) openings are arranged concentrically around the filling opening in the base body.

A preferred embodiment is seen in that the fluid-permeable and gas-permeable element attached in a recess in the back of the base body, preferably mechanically, is configured as a perforated plate.

Alternatively, it is also provided that the fluid-permeable and gas-permeable element that makes firm contact in a recess in the back of the base body, radially on the inside, is provided as an at least one-layer gauze insert.

A further development can be seen in that the bonding and fixing agent, particularly in the case of multi-layer gauze inserts arranged in the recess of the back of the base body, passes through the gauzes directly, so that fewer or no vent openings in the base body are necessary, thereby reducing the effort/expense in terms of production technology.

By means of the use of elements that are fluid-permeable and/or gas-permeable towards the inside and the outside, the result is achieved that the gas that is formed during hardening of the bonding and fixing agent can escape, i.e. volatile binders can evaporate (evaporation) and, at the same time, ambient air reaches the bonding and fixing agent.

Another advantageous embodiment of a fastening means is seen in that passage bores filled with a sponge-like, open-pore material are arranged in the base body, preferably concentrically to the filling opening, so that the excess bonding and fixing agent flows off directly by way of the pores of the sponge-like material, preferably in segments and, at the same time, the air that is present in the openings of the base body, as well as the gases that are formed when the bonding and fixing agent hardens, can escape, and that contact with the ambient air is assured here, also.

A preferred variant is seen in that the passage bores are filled with gauze material.

Another preferred variant is seen in that the entire base body consists of an open-pore material. This embodiment of the invention is particularly advantageous when using silicone as a bonding and fixing agent, since the entry of ambient air towards the bonding and fixing agent is very intensive and therefore humidity can be supplied in an increased amount, without additional effort/expenditure; the supply of moisture can be additionally increased by wetting the open-pore base body.

Another preferred variant for an embodiment of the fastening means is seen in that a plurality of small passage bores is arranged in the base body, to accommodate excess bonding and fixing agent and for the escape of gas as well as air, and supply of the latter.

Advantageous further developments can be seen in that the passage bores are configured in conical shape.

Another preferred embodiment is seen in that a ring made of sponge-like material is provided in the recess in the back of the base body, the contact surface of which has a bonding surface for preliminary fixing of the base body, and the thickness of which forms the limit for a glue join. This ring made of sponge-like material furthermore allows the escape of the gases formed as the bonding and fixing agent hardens, as well as the supply of air.

In addition to the advantages with regard to better introduction of the bonding or fixing agent, another advantage of the new type of embodiment of the base body also consists in that the contact surface between the bonding and fixing agent and the base body was increased by a multiple, as compared with known solutions, and thereby also the ability to withstand stress-forces that can be absorbed.

A preferred embodiment of the closure element that is not only advantageous in terms of production technology but also saves material consists in that the closure element is configured in cap shape and can be releasably affixed to the base body, and has at least one accommodation element for holding objects. Furthermore, it is seen as being advantageous that this closure element configured in cap shape additionally or alternatively has a passage opening through which a connecting element can be introduced into the base body, or that the closure element configured in cap shape is provided as a sealed decorative cap, into which holder elements, for example self-tapping screws or similar elements, can be introduced, if necessary, which can also penetrate into the base body, if necessary.

The installation system according to the invention is characterized in that the different embodiments of the fastening elements can be affixed directly to a wall and various objects can be mechanically attached to them in known manner, so that no drill holes are required, that in this way, not only are the fastening possibilities for the objects increased, but also attachments can be made also on inaccessible wall segments as well as walls with the most varied surfaces, without any damage to the wall surface taking place.

By means of the configuration of the installation system according to the invention, with the fastening element, simple, secure, and quick attachment of different objects to walls, floors, and ceilings, to metal or glass surfaces, or even mirrors, is possible without drill holes.

If, in one case or another, attachment according to the new method is not possible, due to the composition of the substratum (wall surface), e.g. a plaster wall or similar body, then the new base bodies, which have one or more vent openings or bores, can be attached by means of one or more screws that can be passed through the openings or bores in the base body; it also lies within the scope of the invention, however, if additional passage bores or oblong holes are provided in the base body in the new base bodies for such attachments that might be necessary now and again.

Another advantage of the invention consists in that this new installation system can be used without further adaptation work also for sanitary area articles or accessories that are available on the market, such as towel holders, mirror holders, hair dryer holders, console holders, lights, containers for soap emulsions and similar articles. In or for special cases of use, the base body and the closure element coordinated with it can also possess a basic shape that is different from a round shape, for example an oval, prismatic, truncated pyramid shape, or a combined or additional basic shape.

The new installation system can be produced, in terms of production technology, by means of very different production methods, such as pressing or injection-molding of plastics, sintering, lathing, drilling, milling, casting-in, and other methods, which can be used individually or in combination. In this connection, the base body, in particular, can be a homogeneous body or a body joined together from several individual parts.

Figure 13:
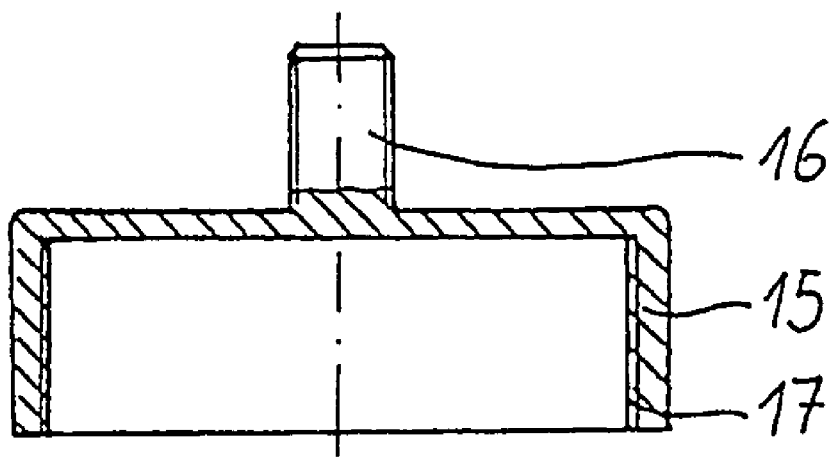
Figure 14:
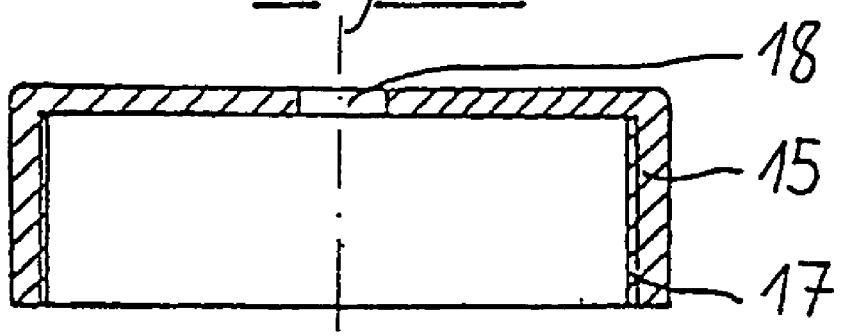
Figure 15:
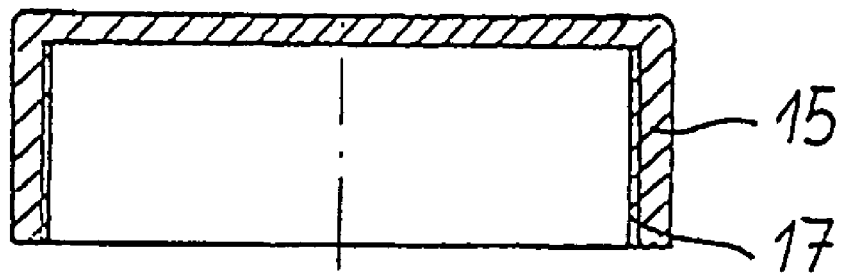

In the following, the invention will be explained more specifically and in detail, using exemplary embodiments shown schematically. The drawing shows:

FIG. 1 a first exemplary embodiment of a base body of the fastening element, in cross-section;

FIG. 1a the fastening element according to FIG. 1, arranged on a wall in a new way;

FIG. 2 the base body from FIG. 1 in a top view;

FIG. 3 a second exemplary embodiment of the base body of the fastening element, in cross-section;

FIG. 4 the base body from FIG. 3 in a top view;

FIG. 5 a third exemplary embodiment of the base body of the fastening element, in cross-section;

FIG. 6 the base body from FIG. 5 in a top view;

FIG. 7 a fourth exemplary embodiment of the base body of the fastening element, in cross-section;

FIG. 8 the base body from FIG. 7 in a top view;

FIG. 9 a fifth exemplary embodiment of the base body of the fastening element, in cross-section;

FIG. 10 the base body from FIG. 9 in a top view;

FIG. 11 a sixth exemplary embodiment of the base body of the fastening element, in cross-section;

FIG. 12 the base body from FIG. 11 in a top view;

FIG. 13 a first embodiment of a closure element, in cross-section;

FIG. 14 a second embodiment of a closure element, in cross-section;

FIG. 15 a third embodiment of a closure element, in cross-section.

FIGS. 1 to 12 show a base body 1 of the installation system according to the invention, in various embodiments. The base body 1 of a fastening element that is to be attached to a wall 22 shown in FIG. 1a, for example a tile, is first pre-positioned on the wall 22 by means of an adhesion aid, not shown here.

Afterwards, the bonding and fixing agent is introduced, in metered form, through the filling opening 2 arranged in the base body 1. The bonding and fixing agent distributes itself and spreads out in the recess 4 arranged in the back 3 of the base body 1, until the region of the wall 22 covered by the recess 4 has been wetted by the bonding and fixing agent.

It is advantageous if the base body 1 is configured as a single part, round and/or made of plastic, and has (vent) openings 5, between which broken-out parts 7, three in this case, are formed. The front of the base body 1, which faces away from the wall 22, is covered by means of a closure element 15, particularly one configured in cap shape, after the base body 1 has been filled with the bonding and fixing agent—see FIG. 13 to 15—and thereby closed off in terms of appearance and, at the same time, protected, so that water deposits and lime deposits and the formation of mold are prevented, whereby the cap-shaped closure element 15 has an accommodation element 16 for holding objects fixed in place, such as shelves, towel holders, lights, attachment holders or similar fixture articles.

In the exemplary embodiment shown in FIGS. 1 and 2, the excess bonding and fixing agent flows off by way of the (vent) openings 5 in the base body 1, and partly through the fluid-permeable and gas-permeable element 6 arranged and mechanically attached in the recess 4 in the back of the base body 1, which element is provided in the form of a perforated plate or a one-layer or multi-layer gauze insert. This perforated plate and the gauze insert make it possible for the gas that is formed as the bonding and fixing agent hardens to escape. Furthermore, at least one additional broken-out part 7—three here—is arranged in the base body 1, between the vent openings 5. At the same time, however, ambient air, particularly humidity, can also reach the bonding and fixing agent, and this accelerates the curing process when using silicone adhesives.

In the embodiment of the base body 1 shown in FIGS. 3 and 4, no vent openings are provided. In this embodiment of the base body 1, the excess bonding and fixing agent flows off by way of the element 6, which is fluid-permeable and gas-permeable towards the inside and the outside.

The embodiment of the base body 1 in accordance with FIGS. 5 and 6 contains passage bores 8 in the base body 1, preferably arranged concentric to the filling opening 2, in which bores a sponge-like material 9 is provided. This sponge-like material 9 partly absorbs the bonding and fixing agent after the bonding and fixing agent has been metered in through the filling opening 2, and thereby allows the escape not only of the air that is located in the base body 1 during filling, but also of the gases that are formed as the bonding and fixing agent hardens and, in addition, the entry of ambient air to the bonding and fixing agent.

As in the case of the embodiments according to FIGS. 1 to 4, here again, in the embodiment according to FIGS. 5 and 6, the sponge-like material 9 that is used as an alternative to the fluid-permeable and gas-permeable element 6, is mechanically firmly connected with the base body 1, in suitable, known manner.

In another embodiment of the base body 1, in accordance with FIGS. 7 and 8, the entire base body 1 consists of a sponge-like material that allows the escape of the air that is located in the recess of the base body 1 during filling, as well as the gas that is formed as the bonding and fixing agent hardens, or of the escaping binder, and contact of the ambient air, including the humidity contained in the latter, with the bonding and fixing agent and, at the same time, in part, i.e. to a slight extent, absorbs the excess bonding and fixing agent after the latter has been filled into the base body 1 by way of the filling opening 2.

FIGS. 9 and 10 show an advantageous embodiment of the base body 1, which has a plurality of preferably small bores 10 that pass through the base body 1, which also absorb excess bonding and fixing agent after the latter has been filled into the base body 1 by way of the filling opening 2, and allow the escape of air from the recess 4, as well as of the gas that is formed as the bonding and fixing agent hardens. At the same time, contact between the ambient air and the bonding and fixing agent is assured.

In the additional advantageous embodiment shown in FIGS. 11 and 12, the base body 1 has a ring 11 made of sponge-like material assigned to it, which ring is arranged in a recess 12, preferably close to the edge, in the back 3 of the base body 1. Because at least one of the faces of the ring 11 has a bonding surface 13, the base body 1 can be provisionally fixed in place. The recess 4' between the back 3 of the base body 1 and a wall, not shown, is formed by the thickness 19 of the ring 11. Also because of its sponge-like, particularly hard-sponge-like material structure, the ring 11 also allows escape of the gases that occur as the bonding and fixing agent hardens, i.e. of binder, as well as contact between ambient air and the bonding and fixing agent. The excess bonding and fixing agent flows into (vent) openings 14 that are particularly arranged concentrically, whereby the filling opening 2 for the bonding and fixing agent is not arranged in the center of the base body 1, but rather preferably can be one of the vent openings 14 arranged radially.

FIGS. 13 to 15 show embodiments of a closure element 15 preferably configured in cap shape. The closure element 15 configured in cap shape according to FIG. 13, is fitted with a thread 17 on its inner mantle surface, and can be screwed onto the base body 1 by means of the same 17. In addition, the closure element 15 possesses a fixed accommodation element 16, here preferably on its surface that faces away from the wall, which is attached to the closure element 15 with a non-positive and/or a positive lock. This accommodation element 16 serves for a connection with part of the holder of a commercially available object of use for the sanitary sector, as it was already mentioned above.

The accommodation element 16, shown in the form of a threaded bolt here, can also be part of a plug-in connection, e.g. a clip element or a guide, e.g. a swallowtail guide, which is configured to run together, in narrowed form, for the purpose of self-locking, or another element of a known connection technology. This accommodation element can also be provided on the mantle surface of the closure element 15.

The embodiment of the closure element 15 according to FIG. 14 has a passage bore 18, through which a known connecting element, not shown in detail, of a sanitary article can be introduced into the base body 1.

FIG. 15 shows an embodiment of the closure element 15 that is provided only as a closed, decorative cap, into which holder elements, for example self-tapping screws, can be introduced, if necessary; as a rule, these also engage in the base body.

The invention is not limited to the exemplary embodiments, but rather can be varied in many different ways, within the scope of the disclosure.

All of the new individual and combination characteristics disclosed in the specification and/or drawing are considered to be essential to the invention.

REFERENCE SYMBOL LIST

1 base body
2 filling opening
3 back of the base body
4, 4' recesses in the back of item 1
5 opening (ventilation or vent opening)
6 fluid-permeable and gas-permeable element
7 broken-out part
8 passage bore
9 sponge-like material
10 bore
11 ring
12 recess in the back
13 bonding surface
14 vent opening
15 closure element
16 accommodation element
17 thread in the closure element
18 passage bore in the closure element
19 thickness of item 11
20 bonding and fixing agent
21 direction of filling
22 wall

The invention claimed is:

1. Installation system for affixing fastening elements to a wall, ceiling, or similar surface, particularly in rooms fitted with tiles, marble panels, or similar wall paneling, whereby the fastening element can be attached by means of introducing a bonding and fixing agent between the installation system and the wall, and whereby the fastening element is configured to accommodate an element for holding objects that are fixed in place, such as towel holders, shelves, lights, or similar fixture articles,
wherein
    a base body (1) of the fastening element has a filling opening (2) for introducing a bonding or fixing agent between the wall and the fastening element, the base body (1) has at least one opening (5) to allow excess bonding or fixing agent to flow off, the base body (1) itself is configured, at least in partial regions, so as to be fluid-permeable and gas-permeable, and wherein the fluid-permeable and gas-permeable partial regions of the base body are formed by at least one element (6) that lies radially on the inside in a recess (4) in the back (3) of the base body (1) and is a single-layer or multi-layer gauze insert.

2. Installation system according to claim 1, wherein when a gauze insert (6) configured in multiple layers is arranged in the recess (4) in the back (3) of the base body (1), no openings (5) are provided.

3. Installation system for affixing fastening elements to a wall, ceiling, or similar surface, particularly in rooms fitted with tiles, marble panels, or similar wall paneling, whereby the fastening element can be attached by means of introducing a bonding and fixing agent between the installation system and the wall, and whereby the fastening element is configured to accommodate an element for holding objects that are fixed in place, such as towel holders, shelves, lights, or similar fixture articles,
wherein
    a base body (1) of the fastening element has a filling opening (2) for introducing a bonding or fixing agent between the wall and the fastening element, the base body (1) has at least one opening (5) to allow excess bonding or fixing agent to flow off, the base body (1) itself is configured, at least in partial regions, so as to be fluid-permeable and gas-permeable, and passage bores (8) filled with an open-pore material (9) are arranged in the base body (1), concentric to the filling opening (2).

4. Installation system according to claim 3, wherein the passage bores (8) are filled with gauze material.

5. The installation system according to claim 1, wherein the entire base body consists of an open pore material.

6. The installation system according to claim 3, wherein the entire base body consists of an open pore material.

\* \* \* \* \*